United States Patent
Shigeto et al.

(10) Patent No.: US 9,745,436 B2
(45) Date of Patent: Aug. 29, 2017

(54) SENSOR AND A METHOD OF MAKING THE SAME

(71) Applicant: TOYO TIRE & RUBBER CO., LTD., Osaka-shi, Osaka (JP)

(72) Inventors: Junichi Shigeto, Osaka (JP); Takeshi Fukuda, Osaka (JP); Hiroyuki Anzai, Osaka (JP); Zhiwei Luo, Hyogo (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 109 days.

(21) Appl. No.: 14/653,117

(22) PCT Filed: Nov. 27, 2013

(86) PCT No.: PCT/JP2013/081874
§ 371 (c)(1),
(2) Date: Jun. 17, 2015

(87) PCT Pub. No.: WO2014/112216
PCT Pub. Date: Jul. 24, 2014

(65) Prior Publication Data
US 2015/0338291 A1     Nov. 26, 2015

(30) Foreign Application Priority Data

Jan. 15, 2013    (JP) ................................ 2013-004662

(51) Int. Cl.
*G01L 1/12*       (2006.01)
*C08J 9/00*       (2006.01)
(Continued)

(52) U.S. Cl.
CPC ............. *C08J 9/0014* (2013.01); *B29C 44/02* (2013.01); *C08G 18/10* (2013.01); *C08J 9/0061* (2013.01);
(Continued)

(58) Field of Classification Search
CPC .... B29C 44/02; C08G 18/10; C08G 2101/00; C08J 2201/022; C08J 2205/06;
(Continued)

(56) References Cited

U.S. PATENT DOCUMENTS 4,959,997 A    10/1990   Aisa et al.
2003/0215731 A1*   11/2003   Saiki .................... G03G 9/0827
                                                       430/110.3

(Continued)

FOREIGN PATENT DOCUMENTS

JP         53-18699 A      2/1978
JP         2-116719 A      5/1990
(Continued)

OTHER PUBLICATIONS

J-PlatPat, NPL, JP200241424A.html, Jun. 2, 2017.*
(Continued)

*Primary Examiner* — Francis Gray
(74) *Attorney, Agent, or Firm* — Westerman, Hattori, Daniels & Adrian, LLP (57) ABSTRACT

The present invention provides a sensor having an improved sensitivity and precision, which is lighter and more flexible than conventional sensors, and a method of making the sensor. The present invention relates to a sensor comprising a resin foam containing a magnetic filler, and a magnetic sensor that detects a magnetic change caused by a deformation of the resin foam, wherein the resin foam is a polyurethane resin foam that comprises a polyisocyanate component, an active hydrogen component, a catalyst and a foam stabilizer, and wherein the resin foam has a hardness change $(H_1 - H_{60})$ of 0 to 10 between a JIS-C hardness $(H_1)$ in one second after contact with a pressure surface of a hardness tester and a JIS-C hardness $(H_{60})$ in 60 seconds after the contact.

11 Claims, 1 Drawing Sheet

(51) Int. Cl.
    *G01D 5/12*         (2006.01)
    *B29C 44/02*       (2006.01)
    *C08G 18/10*       (2006.01)
    *C08J 9/30*         (2006.01)
    *C08G 101/00*     (2006.01)

(52) U.S. Cl.
    CPC ........... *C08J 9/0066* (2013.01); *C08J 9/0095* (2013.01); *C08J 9/30* (2013.01); *G01D 5/12* (2013.01); *G01L 1/12* (2013.01); *G01L 1/122* (2013.01); *C08G 2101/00* (2013.01); *C08J 2201/022* (2013.01); *C08J 2205/06* (2013.01); *C08J 2207/00* (2013.01); *C08J 2375/08* (2013.01)

(58) Field of Classification Search
    CPC .. C08J 2207/00; C08J 2375/08; C08J 9/0014; C08J 9/0061; C08J 9/0066; C08J 9/0095; C08J 9/30; G01L 1/12; G01L 1/122
    See application file for complete search history.

(56) References Cited

U.S. PATENT DOCUMENTS

| | | | |
|---|---|---|---|
| 2004/0265150 A1* | 12/2004 | McElfresh | B81B 3/0035 417/413.1 |
| 2007/0241849 A1 | 10/2007 | Heinrich et al. | |
| 2008/0036456 A1 | 2/2008 | Kishida et al. | |
| 2009/0218163 A1 | 9/2009 | Takeuchi et al. | |
| 2010/0038579 A1 | 2/2010 | Duwenhorst et al. | |
| 2010/0090691 A1 | 4/2010 | Kishida et al. | |
| 2010/0199524 A1* | 8/2010 | Grun | A43B 1/0054 36/103 |
| 2011/0184557 A1 | 7/2011 | Takeuchi et al. | |
| 2014/0038493 A1 | 2/2014 | Seyanagi | |

FOREIGN PATENT DOCUMENTS

| | | | | |
|---|---|---|---|---|
| JP | 03146004 A | * | 6/1991 | ............ B29C 33/16 |
| JP | 2008-39659 A | | 2/2008 | |
| JP | 2008-507142 A | | 3/2008 | |
| JP | 2009-51148 A | | 3/2009 | |
| JP | 2009-229453 A | | 10/2009 | |
| JP | 2009-241424 A | | 10/2009 | |
| JP | 2009241424 A | * | 10/2009 | |
| JP | 2010-230114 A | | 10/2010 | |
| JP | 2010-532690 A | | 10/2010 | |
| JP | 2011-153826 A | | 8/2011 | |
| JP | 2012-30417 A | | 2/2012 | |
| JP | 2012-241117 A | | 12/2012 | |
| KR | 2009-0116712 A | | 11/2009 | |
| WO | 2012/021058 A1 | | 2/2012 | |
| WO | 2012/147147 A1 | | 11/2012 | |

OTHER PUBLICATIONS

Extended (Supplementary) European Search Report dated Jun. 30, 2016, issued in counterpart European Patent Application No. 13871678.2. (9 pages).
Office Action dated Jul. 26, 2016, issued in counterpart Japanese Application No. 2013-004662, with English translation (5 pages).
Office Action dated Jul. 18, 2016, issued in counterpart Korean Application No. 10-2015-7017880, with English translation (7 pages).
International Search Report dated Feb. 18, 2014, issued in corresponding application No. PCT/JP2013/081874 (2 pages).
Korean Office Action dated Dec. 22, 2015, issued in counterpart Korean Patent Application No. 10-2015-7017880, with English translation. (12 pages).
Communication pursuant to Article 94(3) EPC, issued in European Patent Application No. 13871678.2.
Extended European Search Report dated Mar. 27, 2017, issued in counterpart European Patent Application No. 13871678.2.
Office Action dated Dec. 23, 2016, issued in conterpart Chinese Patent Application No. 201380070432.3 with English translation (12 pages).

* cited by examiner

SENSOR AND A METHOD OF MAKING THE SAME

TECHNICAL FIELD

The present invention relates to a sensor such as a tactile sensor and a bending sensor, that detects deformation caused by a contact with a magnetic foam which is a resin foam containing magnetic fillers; and a method of making the sensor.

BACKGROUND OF THE INVENTION

A sensor that detects a deformation caused by a contact of an object with another object includes a tactile sensor, a bending sensor and the like, and is widely used in various fields. The tactile sensor detects intensity, a position, a direction and the like of the contact and the bending sensor detects a bending deformation. The sensors are applied to, for example, a hand and a skin of a robot, and information such as the intensity, position, direction and the like of the contact obtained from the sensors is utilized as information to determine next action of the robot when controlling a motion of the robot and corresponding to an external pressure. There are various proposals with respect to the sensor and a method of making the sensor (in Patent Documents 1 to 3).

Patent Document 1 discloses a pressure detection device comprising: a buffer member deformable by pressurizing and depressurizing including a magnet, and a sensor assembly for detecting a change in a magnetic field caused by deformation of a buffer portion with a magnetic sensor. The magnet present in the buffer member may be one large magnet (FIG. 1 of Patent Document 1) or small magnets uniformly dispersed (FIG. 7 and the like of Patent Document 1). In case of the one large magnet, there is a problem that it is difficult to detect the deformation due to touching, and a foreign body sensation is caused due to touching it. On the other hand, in case of the small magnets uniformly dispersed, since a phenomenon of canceling magnetic forces between magnet particles occurs even if the direction of the magnetic force of each magnet is the same as one another and the magnet near a contact surface moves but the magnet present inside the buffer member is difficult to move, there is a problem that detection sensitivity is poor when the external force is small and the deformation is very small.

Patent Document 2 discloses a detecting device comprising a viscoelastic magnet obtained by kneading and molding a magnet material and a viscoelastic material and magnetic-flux detecting means for detecting a change in a magnetic flux density vector due to deformation of the viscoelastic magnet. In the detecting device of Patent Document 2, since the magnet material is kneaded in the viscoelastic material, the magnet material is uniformly dispersed. Therefore, since a phenomenon of canceling magnetic forces between the magnet particles occurs and the magnet near a contact surface moves but the magnet present inside the buffer member is difficult to move, there is a problem that detection sensitivity is poor when an external force is small and the deformation is very small as described in Patent Document 1.

Patent Document 3 discloses a magnetostrictor comprising (a) at least one apparatus for generating a magnetic field, and (b) at least one molding member formed from a porous polymer containing a ferromagnetic particle. Patent Document 3 discloses that the porous polymer containing the ferromagnetic particle is used as a vibration sensor, but does not show a performance data such as a sensor sensibility. In addition, Patent Document 3 does not disclose a concrete method of making the porous polymer and properties of the porous polymer. Therefore, there is ample room for further improvement by optimizing the manufacturing method and the properties such as a cell diameter, specific gravity and the like of the porous polymer.

PRIOR ART

Patent Documents

Patent Document 1: JP 2009-229453 A
Patent Document 2: JP 2008-39659 A
Patent Document 3: JP 2008-507142 A

OBJECTS OF THE INVENTION

The object of the present invention is to solve the above mentioned problems and to provide a sensor having an improved sensitivity and precision, which is lighter and more flexible than conventional sensors, and a method of making the sensor.

The present inventors have intensely studied solutions for solving the above mentioned problems and have found that it is possible to provide a sensor having an improved sensitivity and precision, which is lighter and more flexible than conventional sensors, and a method of making the sensor by adjusting a hardness change between a JIS-C hardness in one second after contact with a pressure surface of a hardness tester and a JIS-C hardness in 60 seconds after the contact to a specified range in a sensor comprising a resin foam containing a magnetic filler, and a magnetic sensor that detects a magnetic change caused by a deformation of the resin foam. The present invention has been completed based on the above finding.

SUMMARY OF THE INVENTION

The present invention relates to a sensor comprising:
a resin foam containing a magnetic filler, and
a magnetic sensor that detects a magnetic change caused by a deformation of the resin foam,
wherein the resin foam is a polyurethane resin foam that comprises a polyisocyanate component, an active hydrogen component, a catalyst and a foam stabilizer, and
wherein the resin foam has a hardness change ($H_1$-$H_{60}$) of 0 to 10 between a JIS-C hardness ($H_1$) in one second after contact with a pressure surface of a hardness tester and a JIS-C hardness ($H_{60}$) in 60 seconds after the contact.

In order to suitably carry out the present invention, it is desired that:
the resin foam has a specific gravity of 0.3 to 1.0 and an average cell diameter of 50 to 500 μm; and an amount of the foam stabilizer is within the range of 1 to 10 parts by mass per 100 parts by mass of the resin foam.

As another embodiment, the present invention relates to a method of making a sensor comprising a polyurethane resin foam containing a magnetic filler and a magnetic sensor, the method comprises the steps of:
(i) forming an isocyanate group-containing urethane prepolymer from a polyisocyanate component and an active hydrogen component,
(ii) preliminary stirring an active hydrogen component, a catalyst and a magnetic filler to form a magnetic filler dispersion, (iii) adding a foam stabilizer to the isocyanate group-containing urethane prepolymer to vigorously stir it such that it incorporates bubbles therein as a primary stirring step, (iv) further adding the magnetic filler dispersion thereto and stirring it as a secondary stirring step to prepare a bubble dispersed urethane composition containing the magnetic filler, (v) molding the bubble dispersed urethane composition into a desired shape and cure it to prepare an urethane resin foam containing the magnetic filler, and (vi) magnetizing the urethane resin foam to form a magnetic urethane resin foam.

EFFECTS OF THE INVENTION

According to the present invention, it is possible to provide a sensor having an improved sensitivity and precision, which is lighter and more flexible than conventional sensors, and a method of making the sensor by adjusting a hardness change between a JIS-C hardness in one second after contact with a pressure surface of a hardness tester and a JIS-C hardness in 60 seconds after the contact to a specified range in a sensor comprising a resin foam containing a magnetic filler, and a magnetic sensor that detects a magnetic change caused by a deformation of the resin foam.

In addition, according to the method of making the sensor of the present invention, since it is difficult to discharge bubbles incorporated in a reaction system by adding a foam stabilizer not to a magnetic filler dispersion but to an isocyanate group-containing urethane prepolymer having higher viscosity than the magnetic filler dispersion and then stirring it (primary stirring), foaming can be efficiently conducted, and it is possible to provide a sensor having an improved lightness, flexibility, sensitivity and precision.

DESCRIPTION OF THE PREFERRED EMBODIMENTS

The sensor of the present invention has features that:

the sensor comprises a resin foam containing a magnetic filler, and a magnetic sensor that detects a magnetic change caused by a deformation of the resin foam, the resin foam is a polyurethane resin foam that comprises a polyisocyanate component, an active hydrogen component, a catalyst and a foam stabilizer, and the resin foam has a hardness change ($H_1$-$H_{60}$) of 0 to 10 between a JIS-C hardness ($H_1$) in one second after contact with a pressure surface of a hardness tester and a JIS-C hardness ($H_{60}$) in 60 seconds after the contact.

The magnetic fillers used in the present invention may be metal powder or metal oxide powder which can have a magnetic force by magnetization. Examples thereof include rare earth-based, iron-based, cobalt-based, nickel-based and oxide-based, and all of these may be used. The rare earth-based magnetic filler, by which high magnetic force is obtained, is preferable, but it is not limited thereto. The shape of the magnetic filler is not particularly limited, and may be spherical shape, flat shape, needle shape, columnar shape or undetermined shape. The magnetic filler has an average particle diameter of 0.02 to 500 μm, preferably 0.1 to 400 μm, more preferably 0.5 to 300 μm. When the average particle diameter of the magnetic filler is smaller than 0.02 μm, the magnetic properties of the magnetic filler is poor. On the other hand, when the average particle diameter of the magnetic filler is larger than 500 μm, the mechanical properties of the magnetic resin foam is poor (brittle).

The amount of the magnetic filler is within the range of 1 to 400 parts by mass, preferably 2 to 350 parts by mass, per 100 parts by mass of the resin foam. When the amount of the magnetic filler is smaller than 1 part by mass, it is difficult to detect the change in the magnetic field. On the other hand, when the amount of the magnetic filler is larger than 400 parts by mass, the resin foam itself is brittle, and the desired properties cannot be obtained.

As a resin foam used in the magnetic resin foam of the present invention, general resin foams may be used, but a thermosetting resin foam is preferable in consideration of the properties such as compression set. Examples of the thermosetting resins used in the magnetic resin foam of the present invention include polyurethane resin foam, silicone resin foam and the like, and polyurethane resin foam is preferable.

In the case of the polyurethane resin foam, the isocyanate component and active hydrogen-containing compound, which can be used in the present invention, are as follows.

The isocyanate component is not particularly limited, but compounds known in the field of polyurethane can be used. Examples of the isocyanate components include aromatic diisocyanates such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, 1,5-naphthalene diisocyanate, p-phenylene diisocyanate, m-phenylene diisocyanate, p-xylylene diisocyanate, and m-xylylene diisocyanate; aliphatic diisocyanates such as ethylene diisocyanate, 2,2,4-trimethyl hexamethylene diisocyanate, 1,6-hexamethylene diisocyanate; cycloaliphatic diisocyanates such as 1,4-cyclohexane diisocyanate, 4,4'-dicyclohexylmethane diisocyanate, isophorone diisocyanate, norbornane diisocyanate; and the like. These isocyanate components may be used alone or in combination of two or more thereof. In addition, the isocyanate may be an urethane-modified, allophanate-modified, biuret-modified or isocyanurate-modified isocyanate. The isocyanates may be a prepolymer with the polyol described later.

As the active hydrogen-containing compound, active hydrogen-containing compounds conventionally used in the polyurethane art can be used. Examples of the active hydrogen-containing compounds include, for example, polyether polyols such as polytetramethylene ether glycol, polyethylene glycol; polyester polyols such as polybutylene adipate; polyester polycarbonate polyols such as a reactant of alkylene carbonate with polyester glycols (such as polycaprolactone polyester, polycaprolactone); polyester polycarbonate polyols obtained by reacting ethylene carbonate with a polyhydric alcohol to form a reaction mixture, and then reacting the reaction mixture with an organic dicarboxylic acid; polycarbonate polyols obtained by a transesterification reaction of a polyhydroxyl compound and aryl carbonate;

and the like. These active hydrogen-containing compounds may be used alone or in combination of two or more thereof.

A low molecular weight polyol component and low molecular weight polyamine component may be used in addition to the high molecular weight polyol components described above as the active hydrogen-containing compound. Examples of the low molecular weight polyol components include ethylene glycol, 1,2-propylene glycol, 1,3-propylene glycol, 1,4-butanediol, 1,6-hexanediol, neopentyl glycol, 1,4-cyclohexanedimethanol, 3-methyl-1,5-pentanediol, diethylene glycol, triethylene glycol, 1,4-bis(2-hydroxyethoxy)benzene, trimethylolpropane, glycerin, 1,2,6-hexane triol, pentaerythritol, tetramethylol cyclohexane, methyl glucoside, sorbitol, mannitol, dulcitol, sucrose, 2,2,6,6-tetrakis(hydroxymethyl)cyclohexanol and triethanolamine. Examples of the low molecular weight polyamine components include ethylene diamine, tolylene diamine, diphenylmethane diamine and diethylenetriamine. These active hydrogen-containing compounds may be used alone or in combination of two or more thereof. It is possible to further mix polyamines. Examples of the polyamines include 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluene diamine, 3,5-bis(methylthio)-2,6-toluene diamine, 3,5-diethyl toluene-2,4-diamine, 3,5-diethyl toluene-2,6-diamine, trimethylene glycol-di-p-aminobenzoate, polytetramethyleneoxide-di-p-aminobenzoate, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 4,4'-diamino-3,3'-diethyldiphenylmethane, 4,4'-diamino-3,3'-diethyl-5,5'-dimethyldiphenylmethane, 4,4'-diamino-3,3'-diisopropyl-5,5'-dimethyldiphenylmethane, 4,4'-diamino-3,3',5,5'-tetraethyldiphenylmethane, 4,4'-diamino-3,3',5,5'-tetraisopropyldiphenylmethane, m-xylylene diamine, N,N'-di-sec-butyl-p-phenylenediamine, m-phenylenediamine and p-xylylene diamine.

Examples of catalysts used in the polyurethane resin foam, which are not limited thereto and can include well known catalysts, preferably include tertiary amine catalysts such as triethylene diamine(1,4-diazabicyclo[2,2,2]octane), N,N,N',N'-tetramethylhexanediamine, bis(2-dimethylaminoethyl)ether and the like, and metal catalysts such as tin octoate, lead octoate and the like may be used therewith.

Examples of commercially available catalysts include "TEDA-L33", which is commercially available from Tosoh Corporation, "NIAX CATALYST A1", which is commercially available from Momentive Performance Materials Inc., "KAOLIZER NO. 1", "KAOLIZER NO. 30P", which are commercially available from Kao Corporation, "DABCO T-9", which is commercially available from Air Products and Chemicals, Inc., "BTT-24", which is commercially available from Toei Chemical Industry Co. Ltd. and the like.

As a foam stabilizer used in the polyurethane resin foam, a foam stabilizer such as a silicone-based foam stabilizer, a fluorine-based foam stabilizer, which is conventionally used for producing polyurethane resin foam, can be used. A silicone-based surfactant and fluorine-based surfactant used as the silicone-based foam stabilizer and fluorine-based foam stabilizer contain a portion soluble in a polyurethane system and a portion insoluble in the system in a molecule. The portion insoluble in the system uniformly disperses a polyurethane-based material, and bubbles are easily generated and it is difficult to break the bubbles by reducing a surface tension of the polyurethane system. However, when the surface tension is too low, it is difficult to generate bubbles. In the resin foam of the present invention, for example, when using the silicone-based surfactant, it is possible to reduce a diameter of the bubble or to increase the number thereof by a dimethylpolysiloxane structure as the portion insoluble in the system.

Examples of commercially available products of the silicone-based foam stabilizer include, for example, "SF-2962", "SRX 274D", "SF-2965", "SF-2904", "SF-2908", "SF-2904", "L5340", which are commercially available from Dow Corning Corporation, "Tegostab B8017", which is commercially available from Evonik Degussa Corporation and the like. Examples of commercially available products of the fluorine-based foam stabilizer include, for example, "FC430", "FC4430", which are commercially available from 3M Company, "FC142D", "F552", "F554", "F558", "F561", "R41", which are commercially available from Dainippon Ink & Chemicals Inc. and the like.

It is desired that an amount of the foam stabilizer is within the range of 1 to 10 parts by mass, preferably 1.5 to 9.5 parts by mass per 100 parts by mass of the resin foam. When the amount of the foam stabilizer is smaller than 1 part by mass, foaming is not sufficiently conducted. On the other hand, when the amount of the foam stabilizer is larger than 10 parts by mass, there is a possibility that it causes bleeding out.

It is required for the polyurethane resin foam of the present invention to have a hardness change ($H_1$-$H_{60}$) of 0 to 10 between a JIS-C hardness ($H_1$) in one second after contact with a pressure surface of a hardness tester and a JIS-C hardness ($H_{60}$) in 60 seconds after the contact. The hardness change is within the rage of preferably 0 to 9, more preferably 0 to 8. The polyurethane resin foam has a JIS-C hardness ($H_1$) in one second after contact with a pressure surface of a hardness tester of 10 to 50, preferably 15 to 45, more preferably 20 to 40.

The JIS-C hardness is a hardness measured according to JIS K-7312, and a spring type hardness tester (durometer) is used. The hardness tester has a structure so as to indicate a distance that an indentor protruded from a center hole of the pressure surface by a spring pressure is pushed back by the test specimen by a scale as a hardness, when bringing a pressure surface (pressure foot) of the hardness tester closely into contact with the surface of a test specimen. Therefore, when the hardness change ($H_1$-$H_{60}$) between a JIS-C hardness ($H_1$) in one second after contact with a pressure surface of a hardness tester and a JIS-C hardness ($H_{60}$) in 60 seconds after the contact is higher than 10, the restorability of the test specimen is poor, and it is shown that the indentor of the hardness tester is not pushed back before measuring H60 and after measuring H1 and the indentor is further pushed into the test specimen. When the hardness change is 0, it is shown that there is no change between $H_1$ and $H_{60}$, and thus the lower limit of the hardness change ($H_1$-$H_{60}$) is 0.

It is desired that the polyurethane resin foam of the present invention has a specific gravity of 0.3 to 1.0, preferably 0.35 to 0.95, more preferably 0.4 to 0.9. When the specific gravity is lower than 0.3, a volume of bubbles is large and an amount of magnetic fillers is relatively small, and sensor sensitivity is reduced. On the other hand, when the specific gravity is higher than 1.0, a weight of the resin foam is increased. The specific gravity as used herein means a specific gravity measured according to JIS Z-8807-1976.

It is desired that the polyurethane resin foam of the present invention has an average cell diameter of 50 to 500 μm, preferably 55 to 450 μm, more preferably 60 to 400 μm. When a large amount of the foam stabilizer is used such that the average cell diameter is smaller than 50 μm, the foam stabilizer may bleed from the resin foam. On the other hand, when the average cell diameter is larger than 500 μm, the number of bubbles is reduced, and the specific gravity is high and the restorability is reduced. As a measuring method of the average cell diameter, a measurement sample having a thickness of 1 mm is cut from the urethane resin foam, a cross-section of the sample is observed using a scanning electron microscope (SEM) at a magnification of 100. Using an image analysis software, diameters of all bubbles in an arbitrary range (2 mm×2.4 mm) of the cross-section are measured from the obtained image, and an average cell diameter is determined thereby.

The method of making the sensor of the present invention is characterized by comprising the steps of:

(i) forming an isocyanate group-containing urethane prepolymer from a polyisocyanate component and an active hydrogen component, (ii) preliminary stirring an active hydrogen component, a catalyst and a magnetic filler to form a magnetic filler dispersion, (iii) adding a foam stabilizer to the isocyanate group-containing urethane prepolymer to vigorously stir it under a non-reactive gas atmosphere such that it incorporates bubbles therein as a primary stirring step, (iv) further adding the magnetic filler dispersion thereto and stirring it as a secondary stirring step to prepare a bubble dispersed urethane composition containing the magnetic filler, (v) molding the bubble dispersed urethane composition into a desired shape and then curing it to prepare an urethane resin foam containing the magnetic filler, and (vi) magnetizing the urethane resin foam to form a magnetic urethane resin foam.

There are a chemical foaming process, in which a reactive foaming agent such as water is used, and a mechanical foaming process, in which a polyisocyanate component and a mixture of an active hydrogen component with a catalyst are mechanically stirred, as a method of producing an urethane resin foam. It is well known that a molding operation in the mechanical foaming process is simpler than that of the chemical foaming process and a molded article obtained by the mechanical foaming process has excellent toughness and excellent impact resilience because water is not used as the foaming agent to produce no urea group and thus physical properties are not reduced. However, it is a problem that the molded article obtained by the mechanical foaming process has low flexibility because it is difficult to hold bubbles in a reaction mixture solution and thus a density of the resulting molded article is too high.

Therefore, in the method of the present invention, the mechanical foaming process is used as shown in the step (iii) without the chemical foaming process using the reactive foaming agent such as water. Thereby, in the method of the present invention, a molding operation is simpler than that of the chemical foaming process and a molded article obtained has excellent toughness and excellent impact resilience (restorability) because water is not used as the foaming agent to produce no urea group and thus physical properties are not reduced.

Firstly, an isocyanate group-containing urethane prepolymer is formed from a polyisocyanate component and an active hydrogen component as shown in the step (i) and an active hydrogen component, a catalyst and a magnetic filler are preliminary stirred to form a magnetic filler dispersion as shown in the step (ii). A foam stabilizer is added to the isocyanate group-containing urethane prepolymer to vigorously stir it such that it incorporates bubbles therein as shown in a primary stirring step (iii) and the magnetic filler dispersion is further added thereto and vigorously stirring it to prepare a bubble dispersed urethane composition containing the magnetic filler as shown in a secondary stirring step (iv). The method of forming the polyurethane resin foam after forming an isocyanate group-containing urethane prepolymer in advance in the polyurethane resin foam comprising the polyisocyanate component, active hydrogen component and catalyst is well known in the art as shown in the steps (i) to (iv). Therefore, manufacturing conditions can be suitably selected depending on a formulation material, but they are selected such that a prepolymer containing an isocyanate group at the molecular terminal is formed by a reaction of the active hydrogen component with an excess amount of the polyisocyanate component.

In forming conditions of the step (i), firstly a formulation ratio of the polyisocyanate component to the active hydrogen component is select such that a ratio of a isocyanate group in the polyisocyanate component to an active hydrogen group in the active hydrogen component (isocyanate group/active hydrogen group) is within the range of 1 to 6, preferably 2 to 5. In addition, a reaction temperature is preferably within the range of 60 to 120° C. and a reaction time is preferably within the range of 3 to 8 hours. Furthermore, urethanization reaction catalysts, which is conventionally well known, organic catalysts such as lead octoate, which is commercially available from Toei Chemical Industry Co., Ltd. under the trade name "Hexoate lead 24%", "TEDA-L33", which is commercially available from Tosoh Corporation, "NIAX CATALYST A1", which is commercially available from Momentive Performance Materials Inc., "KAOLIZER NO. 1", which are commercially available from Kao Corporation, "DABCO T-9", which is commercially available from Air Products and Chemicals, Inc., "BTT-24", which is commercially available from Toei Chemical Industry Co. Ltd. and the like may be used. As the apparatus used in the step (i), a conventional apparatus, which can be used for producing a polyurethane, can be used as long as the materials can be reacted by stirring and mixing them at the above conditions.

Methods for performing the preliminary stirring of the step (ii) include a method performed with a general mixer which can mix the liquid resin with the filler, such a homogenizer, a dissolver, biaxial planetary mixer and the like.

In the step (iii) of the method of the present invention, the foam stabilizer is not added to the magnetic filler dispersion formed in the step (ii), but it is added to the isocyanate group-containing urethane prepolymer having higher viscosity than the magnetic filler dispersion to stir it (a primary stirring step), and then in the step (iv) of the method of the present invention, the magnetic filler dispersion is further added thereto to stir it (a secondary stirring step). Thereby, it is difficult to discharge bubbles incorporated in a reaction system and the foaming is efficiently conducted, and it is possible to provide a sensor having an improved lightness, flexibility, sensitivity and precision.

The non-reactive gas in the step (iii) is preferably non-combustible, and concrete examples thereof include nitrogen, oxygen, carbon dioxide, noble gas such as helium, argon and the like, or mixtures thereof. It is most preferable to use air, in which moisture is removed by drying. In addition, as the conditions of the primary stirring and secondary stirring, particularly primary stirring, conditions for producing urethane foams by a conventional mechanical foaming process can be used and the conditions are not limited, but the primary stirring and secondary stirring are conducted by vigorously stirring at a number of revolution of 1000 to 10000 rpm for 1 to 30 minutes by using a stirring blade or a mixer with a stirring blade. Examples of the apparatus include a homogenizer, a dissolver, a mechanical froth foaming machine and the like.

In the step (v) of the method of the present invention, a method of molding the bubble dispersed urethane composition into a desired shape such as a sheet is not particularly limited, but examples of the methods include, for example, a batch-type molding method comprising a step of injecting the mixed solution into a release-treated mold to cure it, a continuous molding method comprising a step of continuously supplying the bubble dispersed urethane composition on a release-treated surface material to cure it and the like. In addition, the curing conditions are not particularly limited, but the step is performed preferably at 60 to 200° C. for 10 minutes to 24 hours. When the curing temperature is too high, the resin foam is thermally degraded, and the mechanical strength is reduced. On the other hand, when the curing temperature is too low, the curing of the resin foam is insufficient. In addition, when the curing time is too long, the resin foam is thermally degraded, and the mechanical strength is reduced. On the other hand, when the curing time is too short, the curing of the resin foam is insufficient.

In the step (vi) of the method of the present invention, the method of magnetizing the magnetic filler is not particularly limited, but it can be performed with a magnetization device conventionally used, for example, "ES-10100-15SH" manufactured by Denshijiki industry Co., Ltd., "TM-YS4E" manufactured by Tamagawa Co., Ltd. and the like. The step (vi) is performed by generally applying a magnetic field having a magnetic flux density of 1 to 3 T. The magnetic filler may be added to the magnetic filler dispersion after magnetization in the step (ii) of forming the magnetic filler dispersion. However, it is preferable to magnetize the magnetic filler in the step (iv) in order to easily handle the magnetic filler before the step (iv).

Figure 1:
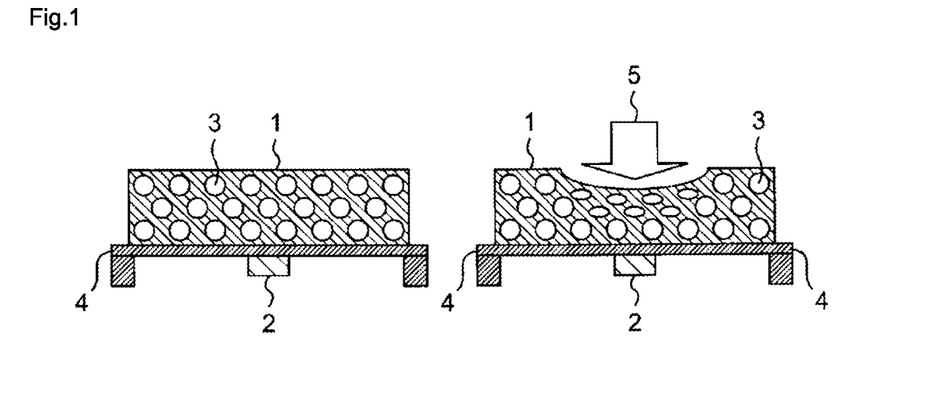
FIG. 1 is a schematic cross section illustrating one embodiment of the tactile sensor as the sensor of the present invention, which schematically illustrates the change between the state that no pressure is applied thereon and the state that pressure is applied thereto.
Figure 2:
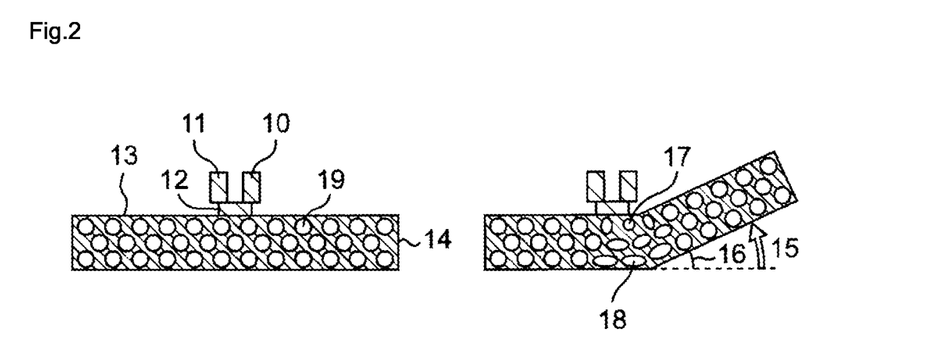
FIG. 2 is a schematic cross section illustrating one embodiment of the bending sensor as the sensor of the present invention, which schematically illustrates the state that it is not bended and the state that it is bended, and is a schematic diagram illustrating the positional relationship between the resin foam and three magnetic sensors in the bending sensor characteristics evaluation used in Examples.

With respect to a tactile sensor and bending sensor as the sensor comprising the magnetic resin foam obtained by the steps (i) to (vi) of the method of the present invention and the magnetic sensor, the present invention will be described with reference to FIG. 1 and FIG. 2, respectively. FIG. 1 is a schematic cross section illustrating one embodiment of the tactile sensor as the sensor using the magnetic resin foam of the present invention, which schematically illustrates the change between the state that no pressure is applied thereon (left figure of FIG. 1) and the state that pressure is applied thereto (right figure of FIG. 1). FIG. 2 is a schematic cross section illustrating one embodiment of the bending sensor as the sensor using the magnetic resin foam of the present invention, which schematically illustrates the state that it is not bended (left figure of FIG. 2) and the state that it is bended (right figure of FIG. 2). Therefore, the present invention is not limited by the schematics.

The tactile sensor as the sensor using the magnetic resin foam of the present invention is basically comprised of the magnetic resin foam 1 and the magnetic sensor 2. The magnetic resin foam 1 comprises a plurality of bubbles 3 and magnetic fillers (not indicated). In FIG. 1, a substrate 4 is present between the magnetic resin foam 1 and the magnetic sensor 2. The substrate 4 may not be present, but the sensor usually needs it to support the magnetic resin foam 1. Furthermore, in case that the substrate 4 is not present, when applying the pressure 5 to the magnetic resin foam 1, the whole of the magnetic resin foam 1 is bended, and there is a possibility that the pressure 5 cannot be precisely detected.

The state that no pressure is applied is shown in the left figure of FIG. 1 and it is shown in the right figure of FIG. 1 that when the pressure 5 is applied to the top face of the magnetic resin foam 1 from above, the bubble 3 is deformed such that it is crushed, the magnetic resin foam 1 is deformed, and a position of the magnetic filler is moved downward only at the portion, to which the pressure is applied. The downward change of the magnetic filler causes a change of the magnetic field from the magnetic filler, and the change is detected with the magnetic sensor 2. Since the bubbles 3 are deformed such that they are crushed by the pressure 5 due to the presence of the bubbles 3, the magnetic resin foam 1 is easily deformed, and the deformation amount is large, which improves the sensor sensibility. In addition, when restoring the magnetic resin foam to the state that the pressure 5 is not applied as shown in the left figure of FIG. 1, the deformation of the magnetic resin foam 1 is rapidly restored because of the presence of the bubbles 3, and the restorability is improved.

The bending sensor of the present invention is basically comprised of the magnetic resin foam 13 and the magnetic sensors 10, 11 and 12. The magnetic resin foam 13 comprises a plurality of bubbles 19 and magnetic fillers (not indicated). In FIG. 2, three magnetic sensors 10, 11 and 12 are shown, but the bending sensor may have only two or more magnetic sensors. When the bending sensor has three or more magnetic sensors, the detection accuracy is improved.

The state that it is not bended is shown in the left figure of FIG. 2 and it is shown in the right figure of FIG. 2 that the magnetic resin foam 13 is bended to the angle 16 by putting the end part 14 of the magnetic resin foam 13 up in the direction of the arrow 15. A position of the magnetic filler is largely moved due to the deformation of the magnetic resin foam 13, and the change of the magnetic filler causes a change of the magnetic field from the magnetic filler. The change of the magnetic field is detected with the magnetic sensors 10, 11 and 12. Due to the bending deformation, the inside of the magnetic resin foam 13 is compressed to contract the bubbles 18 and the outside thereof is stretched to expand the bubbles 18. The magnetic fillers are easily displaced with the expansion and contraction due to the presence of the bubbles 19, and the sensor sensibility is improved. In addition, when restoring the magnetic resin foam to the state that there is no deformation as shown in the left figure of FIG. 2, the deformation of the magnetic resin foam 13 is rapidly restored because of the presence of the bubbles 19, and the restorability is improved.

The magnetic sensor 2 may be generally a sensor used to detect the change of the magnetic field. Examples of the magnetic sensors include a magnetoresistive element (for example, a semiconductor compound magnetoresistive element, an anisotropic magnetoresistive element (AMR), giant magnetoresistive element (GMR) or a tunnel magnetoresistive element (TMR), a Hall element, an inductor, MI element, a flux gate sensor and the like. From the viewpoint of the sensitivity, the Hall element is preferably used.

EXAMPLES

The following Examples and Comparative Examples further illustrate the present invention in detail, but are not to be construed to limit the scope of the present invention.

Example 1

In the reaction vessel, 40 parts by mass of polypropylene glycol commercially available from Asahi Glass Co., Ltd. under the trade name of "Preminol 7001" (a number average molecular weight 6000, trifunctional), and 60 parts by mass of polypropylene glycol commercially available from Asahi Glass Co., Ltd. under the trade name "Excenol 3020" (a number average molecular weight 3000, bifunctional) were put, and dehydrated under reduced pressure for 1 hour while stirring. The inside of the reaction vessel was purged with nitrogen gas. To the reaction vessel, 10 parts by mass of diphenylmethane diisocyanate commercially available from Nippon Polyurethane Industry Co., Ltd. under the trade name of "Millionate MT" was added, and then was reacted for 5 hours while the temperature in the reaction vessel was maintained at 80° C. to synthesize an isocyanate group-containing urethane prepolymer A.

Next, as shown in the following Table 1, 46.2 parts by mass of polypropylene glycol commercially available from Asahi Glass Co., Ltd. under the trade name of "Preminol 7001" (a number average molecular weight 6000, trifunctional), 0.1 parts of 1,4-diazabicyclo[2,2,2]octane (commercially available from Kao Corporation) as a catalyst, and 10 parts by mass of a magnetic filler (Sm—Fe—N-based alloy fine powder commercially available from Metal Mining Co., Ltd.; an average particle diameter 2.5 μm) were added thereto, and then dispersing and pre-stirring of the magnetic fillers were conducted with an ultrasonic homogenizer for one minute to obtain a magnetic filler dispersion.

Then, 5 parts by mass of a foam stabilizer commercially available from Dow Corning Toray Co., Ltd. under the trade name of "L-5340" was added to 43.7 parts by mass of the isocyanate group-containing urethane prepolymer A, and vigorously primary-stirred at a number of revolution of 900 rpm for 5 minutes with a stirring blade such that bubbles are incorporated in a reaction system. And then, 56.3 parts by mass of the magnetic filler dispersion was added thereto, and secondary-stirred for one minute to prepare a bubble dispersed urethane composition containing the magnetic fillers. The bubble dispersed urethane composition was cast into a release-treated mold, a thickness of the cast article was adjusted to 1 mm with a nip roll. And then, the cast article was cured at 80° C. for 1 hour to obtain an urethane resin foam containing magnetic fillers. A magnetic urethane resin foam was obtained by magnetizing the resulting urethane resin foam with a magnetization device (manufactured by Denshijiki industry Co., Ltd.) at 1.3 T.

Example 2

A magnetic urethane resin foam was obtained as described in Example 1 except that the primary-stirring time was 20 minutes.

Example 3

A magnetic urethane resin foam was obtained as described in Example 1 except that the primary-stirring time was 1 minute.

Example 4

A magnetic urethane resin foam was obtained as described in Example 1 except that an amount of the foam stabilizer was 2 parts by mass.

Example 5

A magnetic urethane resin foam was obtained as described in Example 1 except that an amount of the foam stabilizer was 9 parts by mass.

Example 6

A magnetic urethane resin foam was obtained as described in Example 1 except that an amount of the foam stabilizer was 9 parts by mass and the primary-stirring time was 20 minutes.

Example 7

A magnetic urethane resin foam was obtained as described in Example 1 except that an amount of the foam stabilizer was 2 parts by mass and the primary-stirring time was 1 minute.

Example 8

A magnetic urethane resin foam was obtained as described in Example 1 except that an amount of the foam stabilizer was 12 parts by mass.

Comparative Example 1

A magnetic urethane resin foam was obtained as described in Example 1 except that the foam stabilizer was added to the magnetic filler dispersion, and it was primary-stirred.

Comparative Example 2

A magnetic urethane resin foam was obtained as described in Example 1 except that:

an isocyanate group-containing urethane prepolymer B was synthesized from 20 parts by mass of polypropylene glycol commercially available from Asahi Glass Co., Ltd. under the trade name of "Preminol 7001" (a number average molecular weight 6000, trifunctional), and 80 parts by mass of polypropylene glycol commercially available from Asahi Glass Co., Ltd. under the trade name "Excenol 3020" (a number average molecular weight 3000, bifunctional);

an amount of the polypropylene glycol commercially available from Asahi Glass Co., Ltd. under the trade name of "Preminol 7001" (a number average molecular weight 6000, trifunctional) is 48.2 parts by mass; and 43.7 parts by mass of the isocyanate group-containing urethane prepolymer A during primary-stirring is replaced with 41.7 parts by mass of the isocyanate group-containing urethane prepolymer B.

TABLE 1

| Formulation of magnetic | Example | | | | |
|---|---|---|---|---|---|
| urethane resin foam | 1 | 2 | 3 | 4 | 5 |
| Isocyanate-group containing urethane prepolymer A | 43.7 | 43.7 | 43.7 | 43.7 | 43.7 |
| Isocyanate-group containing urethane prepolymer B | — | — | — | — | — |
| Preminol 7001 *1 | 46.2 | 46.2 | 46.2 | 46.2 | 46.2 |
| Magnetic filler *2 | 10 | 10 | 10 | 10 | 10 |
| Catalyst DABCO *3 | 0.1 | 0.1 | 0.1 | 0.1 | 0.1 |
| Foam stabilizer *4 | 5 | 5 | 5 | 2 | 9 |
| Primary stirring time (min) | 5 | 20 | 1 | 5 | 5 |

TABLE 2

| Formulation of magnetic urethane resin foam | Example | | | Comparative Example | |
|---|---|---|---|---|---|
| | 6 | 7 | 8 | 1 | 2 |
| Isocyanate-group containing urethane prepolymer A | 43.7 | 43.7 | 43.7 | 43.7 | — |
| Isocyanate-group containing urethane prepolymer B | — | — | — | — | 41.7 |
| Preminol 7001 *1 | 46.2 | 46.2 | 46.2 | 46.2 | 46.2 |
| Magnetic filler *2 | 10 | 10 | 10 | 10 | 10 |
| Catalyst DABCO *3 | 0.1 | 0.1 | 0.1 | 0.1 | 0.1 |
| Foam stabilizer *4 | 9 | 2 | 12 | 5 | 5 |
| Primary stirring time (min) | 20 | 1 | 5 | 5 | 5 |

(*1): Polypropylene glycol commercially available from Asahi Glass Co., Ltd. under the trade name "Preminol 7001" (number average molecular weight: 6,000)

(*2): Sm-Fe-N-based alloy fine powder commercially available from Sumitomo Metal Mining Co., Ltd. (an average particle diameter 2.5 μm)

(*3): 1, 4-diazabicyclo [2, 2, 2] octane (DABCO), which is commercially available from Kao Corporation p1

(*4): Silicone-based surfactant commercially available from Dow Corning Toray Co., Ltd. under the trade name of "L-5340"

With respect to the resulting magnetic polyurethane resin foams, a JIS-C hardness change, a specific gravity, an average cell diameter, a sensor sensibility, a bleed resistance and a restorability were measured or evaluated. The results thereof are shown in the following Tables 3 and 4. The test methods are as follows.

Test Method (1) JIS-C hardness

The JIS-C hardness was measured according to JIS K-7312. A test specimen having a size of 5 cm×5 cm (with an optional thickness) was cut from the resulting magnetic urethane resin foam, and was placed at a temperature of 23° C.±2° C. and a humidity of 50%±5% for 16 hours. At the time of measuring the JIS-C hardness, the measurement sample was stacked to a thickness of 10 mm or more. With a hardness tester (Asker Durometer Type C manufactured by Kobunshi Keiki Co., Ltd.; a height of a pressure surface (pressure foot): 3 mm), a JIS-C hardness ($H_1$) in one second and a JIS-C hardness ($H_{60}$) in 60 seconds, after bringing a pressure surface (pressure foot) of the hardness tester closely into contact with the surface of the test specimen, were measured. A hardness change ($H_1$-$H_{60}$) was determined by calculation.

(2) Specific Gravity

The specific gravity was measured according to JIS Z-8807-1976. A test specimen having a size of 4 cm×8.5 cm (with an optional thickness) was cut from the resulting magnetic urethane resin foam, and was placed at a temperature of 23° C.±2° C. and a humidity of 50%±5% for 16 hours. Using a gravimeter "LA230S" manufactured by Sartorius AG, the specific gravity was measured.

(3) Average Cell Diameter

A test specimen having a thickness of 1 mm was cut from the resulting magnetic urethane resin foam with a razor blade, a cross-section of the test specimen is observed at a magnification of 100 using a scanning electron microscope (SEM) "S-3500N" manufactured by Hitachi Science Systems, Ltd. Using an image analysis software "WinROOF" from Mitani Corporation, diameters of all bubbles in an arbitrary range (2 mm×2.4 mm) of the cross-section are measured from the obtained image, and an average cell diameter is determined by calculation.

(4) Tactile Sensor Characteristics Evaluation

A Hall element (a Hall element commercially available from Asahi Kasei Electronics Co., Ltd. under the trade name of "EQ-430L") was mounted as a magnetic sensor as shown in FIG. 1, and a magnetic urethane resin foam was placed on the surface of the substrate opposite to the side of the mounted magnetic sensor. An output voltage of the Hall element when applying a load thereto using a compression testing machine (Autograph "AG-X" manufactured by Shimadzu Corporation) was measured with a data logger "XL121-M" manufactured by Yokogawa Meters & Instruments Corporation, and the tactile sensor characteristics were obtained. At this time, the load when a voltage value in the data logger was changed was evaluated as a tactile sensor sensitivity. Therefore, it is shown that the tactile sensor sensitivity is good as the values of the tactile sensor sensitivity in Table 3 and Table 4 become small.

(5) Bending Sensor Characteristics Evaluation

Three Hall elements ("EQ-430L" from Asahi Kasei Electronics Co., Ltd.) were mounted on a magnetic urethane resin foam as a magnetic sensor as shown in FIG. 2. In FIG. 2, "10" is the magnetic sensor A, "11" is the magnetic sensor B, "12" is a magnetic sensor C and characteristics of the bending sensor were obtained by putting the end part 14 of the magnetic resin foam 13 up in the direction of the arrow 15 and reading the output voltage of the magnetic sensor at each angle 16. In addition, bending sensor characteristics as the sum of a change rate value of the output voltage of each Hall element at a bending angle of 90 degrees as an evaluation of the sensor sensitivity, which is a total output of the sensor ($\Delta V_{out}$) as an index, are shown in Table 3 and Table 4. It is shown that the sensor sensitivity is good as the total output of the sensor at a bending angle of 90 degrees becomes high.

(6) Bleed Resistance

The magnetic urethane resin foam prepared was placed on a PET release film, and the bleed resistance was evaluated by observing a surface state of the PET release film after one week. The bleed resistance is evaluated by the following evaluation criteria.

Evaluation Criteria

◯: There is no foreign substance adhered on the PET release film.

Δ: There is some foreign substances adhered on the PET release film, but it is no problem.

x: There are many foreign substances adhered on the PET release film.

(7) Restorability

The restorability is determined by measuring an output voltage when restoring the sensor to an unloaded condition after loading a pressure of 100 KPa in evaluation of the tactile sensor sensitivity. The restorability is evaluated by the following evaluation criteria.

Evaluation Criteria

◯: the sensor is immediately (for one minute or less) restored to an output voltage at an initial state.

x: the sensor is not immediately (for one minute or less) restored to an output voltage at an initial state.

Test Results

TABLE 3

| Test item | Example | | | | |
|---|---|---|---|---|---|
| | 1 | 2 | 3 | 4 | 5 |
| JIS-C hardness change | 3 | 2 | 7 | 8 | 1 |
| Specific gravity | 0.68 | 0.48 | 0.88 | 0.93 | 0.33 |
| Average cell diameter (μm) | 140 | 60 | 370 | 450 | 210 |
| Tactile sensor sensitivity (kPa) | 10 | 4 | 12 | 13 | 14 |
| Bending sensor characteristics $\Delta V_{out}$ (%) | 2.31 | 2.52 | 2.39 | 2.34 | 2.11 |
| Bleed resistance | ○ | ○ | ○ | ○ | ○ |
| Restorability | ○ | ○ | ○ | ○ | ○ |

TABLE 4

| Test item | Example | | | Comparative Example | |
|---|---|---|---|---|---|
| | 6 | 7 | 8 | 1 | 2 |
| JIS-C hardness change | 1 | 9 | 2 | 12 | 15 |
| Specific gravity | 0.25 | 1.1 | 0.28 | 0.52 | 1.13 |
| Average cell diameter (μm) | 550 | 700 | 260 | 110 | — |
| Tactile sensor sensitivity (kPa) | 24 | 23 | 20 | 8 | 30 |
| Bending sensor characteristics $\Delta V_{out}$ (%) | 1.78 | 1.65 | 1.88 | 2.41 | 1.52 |
| Bleed resistance | ○ | ○ | Δ | ○ | ○ |
| Restorability | ○ | ○ | ○ | x | x |

As is apparent from the results in Table 3 and Table 4, the tactile sensors and bending sensors obtained by using the magnetic urethane resin foam of Examples 1 to 8 of the present invention have a good restorability and very high sensor sensibility as compared with the tactile sensors and bending sensors of Comparative Examples 1 and 2.

On the other hand, in the sensor of Comparative Example 1, since the magnetic urethane resin foam was produced by adding the foam stabilizer not to the isocyanate group-containing urethane prepolymer, but adding the foam stabilizer to the magnetic filler dispersion having lower viscosity than the isocyanate group-containing urethane prepolymer to primary-stir it, the bubbles were not held in the reaction system, and the JIS-C hardness change was large and the restorability was poor.

In the sensor of Comparative Example 2, since the magnetic urethane resin foam obtained by varying the formulation ratio of two polypropylene glycols in the isocyanate group-containing urethane prepolymer was used, the amount of the trifunctional components was small to reduce the crosslink density, and the JIS-C hardness change was large, the restorability was poor and the sensor sensibility was very low.

DESCRIPTION OF REFERENCE NUMERALS 1, 13: Resin foam
2, 10, 11, 12: Magnetic sensor
3, 19: Bubble
4: Substrate
5: Pressure
17: Contracted bubble
18: Expanded bubble

What is claimed is:

1. A sensor comprising:
a resin foam containing a plurality of bubbles and a magnetic filler, and
a magnetic sensor that detects a change in magnetic field caused by a deformation of the resin foam,
wherein the resin foam is a polyurethane resin foam that comprises a polyisocyanate component, an active hydrogen component, a catalyst and a foam stabilizer, and
wherein the resin foam has a hardness change ($H_1$-$H_{60}$) of 0 to 10 between a JIS-C hardness ($H_1$) in one second after contact with a pressure surface of a hardness tester and a JIS-C hardness ($H_{60}$) in 60 seconds after the contact.

2. The sensor according to claim 1, wherein the resin foam has a specific gravity of 0.3 to 1.0 and an average cell diameter of 50 to 500 μm.

3. The sensor according to claim 1, wherein an amount of the foam stabilizer is within the range of 1 to 10 parts by mass per 100 parts by mass of the resin foam.

4. A method of making a sensor comprising a polyurethane resin foam containing a plurality of bubbles and a magnetic filler and a magnetic sensor, the method comprises the steps of:
(I) forming the polyurethane resin foam containing the plurality of bubbles and the magnetic filler comprising the steps of;
  (i) forming an isocyanate group-containing urethane prepolymer from a polyisocyanate component and an active hydrogen component,
  (ii) preliminary stirring an active hydrogen component, a catalyst and a magnetic filler to form a magnetic filler dispersion,
  (iii) adding a foam stabilizer to the isocyanate group-containing urethane prepolymer to vigorously stir it under a non-reactive gas atmosphere such that it incorporates bubbles therein as a primary stirring step,
  (iv) further adding the magnetic filler dispersion thereto and stirring it as a secondary stirring step to prepare a bubble dispersed urethane composition containing the magnetic filler,
  (v) molding the bubble dispersed urethane composition into a desired shape and then curing it to prepare an urethane resin foam containing the magnetic filler, and
  (vi) magnetizing the urethane resin foam to form a magnetic urethane resin foam, and
(II) placing the polyurethane resin foam containing the plurality of bubbles and the magnetic filler on a surface of the magnetic sensor.

5. The sensor according to claim 1, wherein the sensor is a tactile sensor or a bending sensor.

6. The sensor according to claim 1, wherein the magnetic filler is a metal powder or metal oxide powder which can have a magnetic force by magnetization.

7. The sensor according to claim 1, wherein the magnetic sensor is selected from the group consisting of a semiconductor compound magnetoresistive element, an anisotropic magnetoresistive element, giant magnetoresistive element, a tunnel magnetoresistive element, a Hall element, an inductor, MI element, and a flux gate sensor.

8. The method of making a sensor according to claim 4, wherein the sensor is a tactile sensor or a bending sensor.

9. The method of making a sensor according to claim 4, wherein the magnetic filler is a metal powder or metal oxide powder which can have a magnetic force by magnetization.

10. The method of making a sensor according to claim 4, wherein the desired shape is selected from the group consisting of a spherical shape, a flat shape, a needle shape and a columnar shape.

11. The method of making a sensor according to claim 4, wherein the magnetic sensor is selected from the group consisting of a semiconductor compound magnetoresistive element, an anisotropic magnetoresistive element, giant magnetoresistive element, a tunnel magnetoresistive element, a Hall element, an inductor, MI element, and a flux gate sensor.

* * * * *